(12) United States Patent
Santin Navarro

(10) Patent No.: US 11,192,516 B2
(45) Date of Patent: Dec. 7, 2021

(54) AIRBAG, AIRBAG MODULE, VEHICLE AS WELL AS METHOD OF MANUFACTURING AN AIRBAG

(71) Applicant: Dalphi Metal Espana, S.A., Vigo (ES)

(72) Inventor: Pedro Jose Santin Navarro, Vigo (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 16/822,060

(22) Filed: Mar. 18, 2020

(65) Prior Publication Data

US 2020/0307500 A1    Oct. 1, 2020

(30) Foreign Application Priority Data

Apr. 1, 2019 (DE) .......................... 102019108448.2

(51) Int. Cl.
*B60R 21/231* (2011.01)
*B60R 21/235* (2006.01)

(52) U.S. Cl.
CPC ...... *B60R 21/23138* (2013.01); *B60R 21/235* (2013.01); *B60R 2021/23576* (2013.01)

(58) Field of Classification Search
CPC ............ B60R 21/23138; B60R 21/235; B60R 2021/23576
See application file for complete search history.

(56) References Cited

U.S. PATENT DOCUMENTS

| | | | |
|---|---|---|---|
| 9,802,567 B2 * | 10/2017 | Oh ........................ | B60R 21/235 |
| 10,131,314 B2 | 11/2018 | Yoo et al. | |
| 2003/0178832 A1 | 9/2003 | Roberts et al. | |
| 2005/0269806 A1 | 12/2005 | Huber et al. | |
| 2014/0203541 A1 * | 7/2014 | Wei ....................... | B60R 21/233 |
| | | | 280/730.2 |
| 2016/0288762 A1 * | 10/2016 | Deng .................. | B60R 21/2342 |
| 2019/0071047 A1 | 3/2019 | Zhuang | |

* cited by examiner

*Primary Examiner* — Faye M Fleming
(74) *Attorney, Agent, or Firm* — Tarolli, Sundheim, Covell & Tummino LLP

(57) ABSTRACT

An airbag comprises a front panel (22), a rear panel (24) and an additional panel (26), the front panel (22) and the rear panel (24) being directly connected to each other in a first circumferential portion (28) and the front panel (22) being connected to the additional panel (26) and the additional panel (26) being connected to the rear panel (24) in a second circumferential portion (30).
Further, an airbag module (16), a vehicle (10) and a method of manufacturing the airbag (18) are shown.

19 Claims, 3 Drawing Sheets

AIRBAG, AIRBAG MODULE, VEHICLE AS WELL AS METHOD OF MANUFACTURING AN AIRBAG

RELATED APPLICATION

Figure 1:
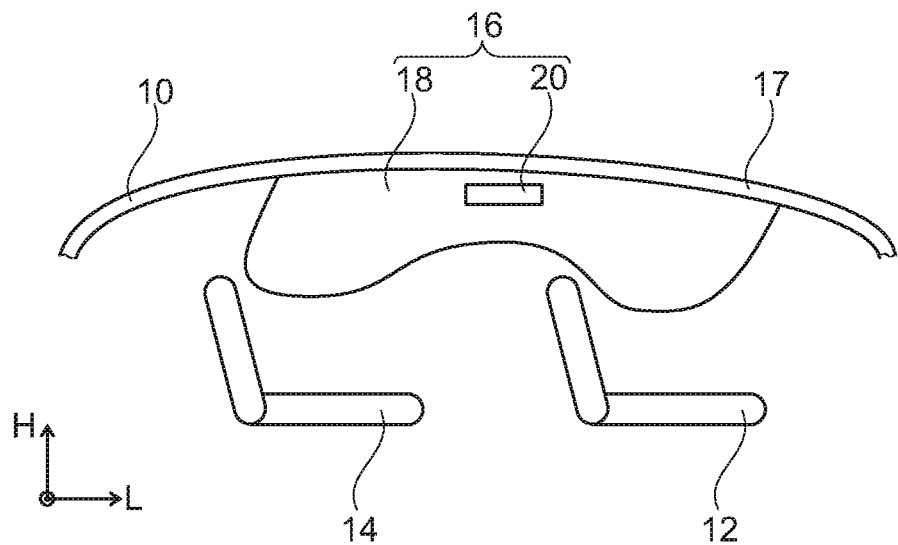

This application claims priority from German Application No. 10 2019 108 448.2 filed Apr. 1, 2019, the subject matter of which is incorporated herein by reference in its entirety.

BACKGROUND OF THE INVENTION

The invention relates to an airbag, especially a side airbag, an airbag module and a vehicle comprising an airbag. Moreover, the invention relates to a method of manufacturing an airbag.

Airbags, in particular side airbags that are in the form of curtain side airbags, are known. Said airbags inter alia serve for stabilizing vehicle occupants sitting on a back seat of the vehicle in the transverse direction.

For this purpose, in the event of release the airbag must have a sufficient thickness between a shoulder of the vehicle occupant and a door lining of the vehicle. In common airbags, the maximum thickness is obtained in the middle of the airbag, however, so that the airbag would have to protrude from the desired protective area, in this case between the shoulder and the door lining, to ensure the desired thickness in the protective area. However, this results in an enlarged volume of the airbag, which requires more complex inflators.

SUMMARY OF THE INVENTION

Therefore, it is the object of the invention to provide an airbag, an airbag module, a vehicle as well as a method of manufacturing an airbag in which the airbag has a large thickness while the volume is comparatively small.

The object is achieved by an airbag, especially a side airbag, for a vehicle occupant restraint system comprising a front panel, a rear panel and an additional panel, the front panel and the rear panel being interconnected at their circumference. In a first circumferential portion of the front panel and the rear panel, the front panel and the rear panel are directly connected, especially sewn, to each other. In a second circumferential portion of the front panel, the front panel is connected, especially sewn, to the additional panel, and in a second circumferential portion of the rear panel the additional panel is connected, especially sewn, to the rear panel.

Due to the additional panel, it is no longer imperative that the thickest area of the airbag is located in the middle of the airbag so that also portions located at the edges of the airbag may have a particularly thick design. In this way, the airbag no longer has to be enlarged beyond the desired area to be protected, thus allowing the volume of the airbag to be kept small.

In addition, it is possible that especially thick areas may be provided even at positions of the vehicle which are difficult to access.

This helps to protect the thorax of the vehicle occupant so that the airbag is a curtain-thorax airbag (CTAB).

For example, in the inflated state the airbag has a larger thickness in the area of the second circumferential portion than in the area of the first circumferential portion.

In order to obtain a compact airbag, the airbag has an outer shell including the front panel, the rear panel and the additional panel.

In one embodiment, the additional panel has a leading edge and a trailing edge, the leading edge being connected to the front panel and the trailing edge being connected to the rear panel, which helps to locally increase the thickness of the airbag by little input of material.

For example, the leading edge and the trailing edge are the only edges of the additional panel. The leading edge may be opposed to the trailing edge.

In a configuration variant, the leading edge and the trailing edge enclose an acute angle, especially at both ends of the leading edge and the trailing edge, in the unfastened spread state of the additional panel. In this way, the thickness of the airbag is continuously increased.

For a simple manufacture of the airbag, the circumference of the front panel and the circumference of the rear panel in the unfastened spread state have a substantially, especially completely, identical contour.

In one embodiment, the airbag has a longitudinal direction and a vertical direction, the second circumferential portion being provided at a vertical end of the airbag, especially the vertical end is completely provided in the second circumferential portion. In this way, the thickness can be increased at one end.

For example, the airbag is larger in the longitudinal direction than in the vertical direction so that the airbag is a curtain airbag.

The additional panel may extend substantially in the vertical direction in the inflated state.

For facilitating the manufacture, the additional panel may be formed integrally with the front panel or the rear panel.

Furthermore, the object is achieved by an airbag module for a vehicle occupant restraint system comprising an inflator and an airbag as afore-described.

In addition, the object is achieved by a vehicle having at least one rear seat and an airbag as afore-described, the additional panel in the inflated state being disposed in the area of the rear seat, especially in a shoulder area of the rear seat, and/or the additional panel being provided at an end of the airbag facing the tail of the vehicle.

The longitudinal direction of the airbag extends, for example, in the longitudinal vehicle direction, the vertical direction of the airbag extends in the vertical vehicle direction and the transverse direction and, resp., thickness extends in the transverse vehicle direction.

Further, the object is achieved by a method of manufacturing an airbag, especially an airbag as afore-described. The method comprises the following steps of:
  a) providing a first panel for the airbag as well as an additional panel for the airbag,
  b) connecting, especially sewing, the additional panel to the first panel in a second circumferential portion of the first panel,
  c) providing a second panel for the airbag,
  d) connecting the second panel directly to the first panel in a first circumferential portion of the first panel and a first circumferential portion of the second panel, and
  e) connecting the second panel to the additional panel at a second circumferential portion of the second panel.

For example, the first panel is a rear panel of the airbag and the second panel is a front panel of the airbag, or vice versa.

The features and advantages described concerning the airbag are equally applicable to the airbag module, the vehicle as well as the method, and vice versa.

Figure 2:
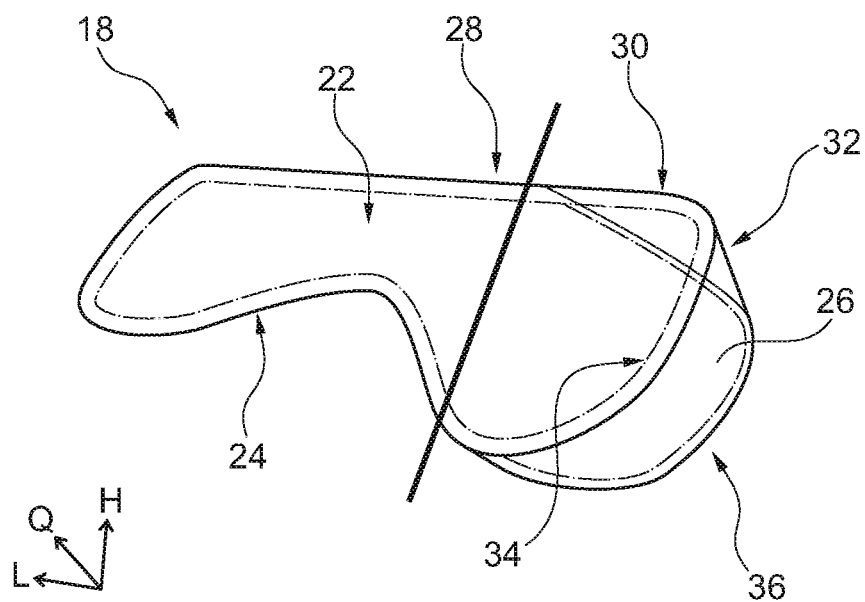
Figure 3A:
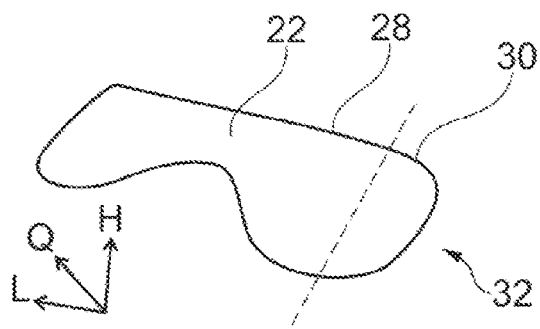
Figure 3B:
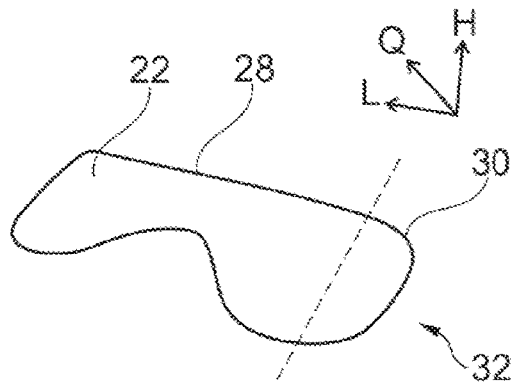
Figure 3C:
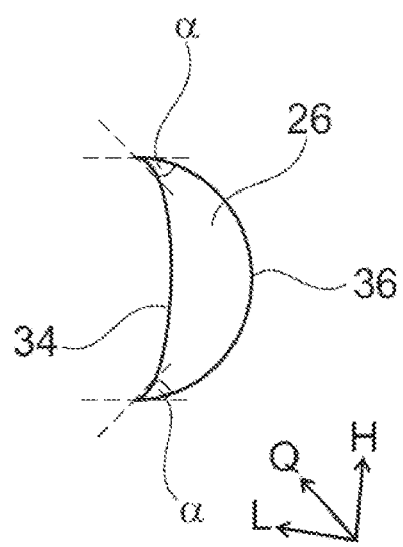
Figure 4:
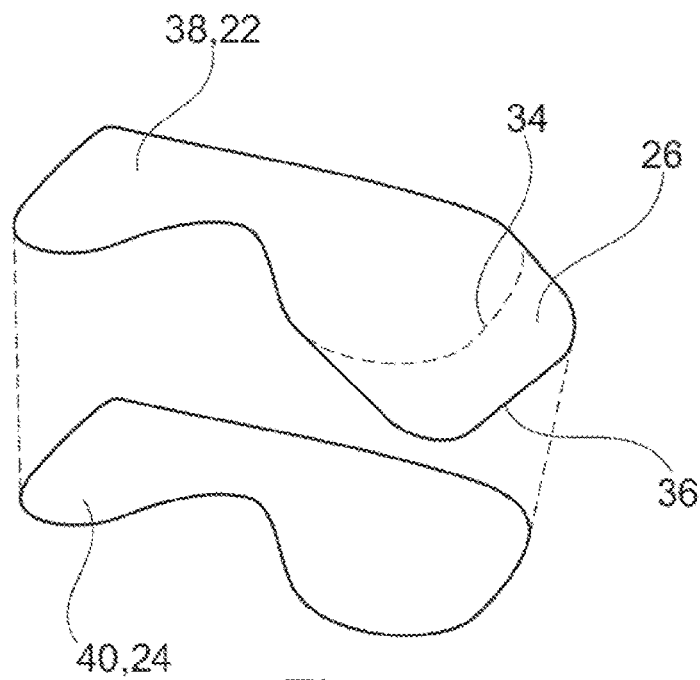
Figure 5:
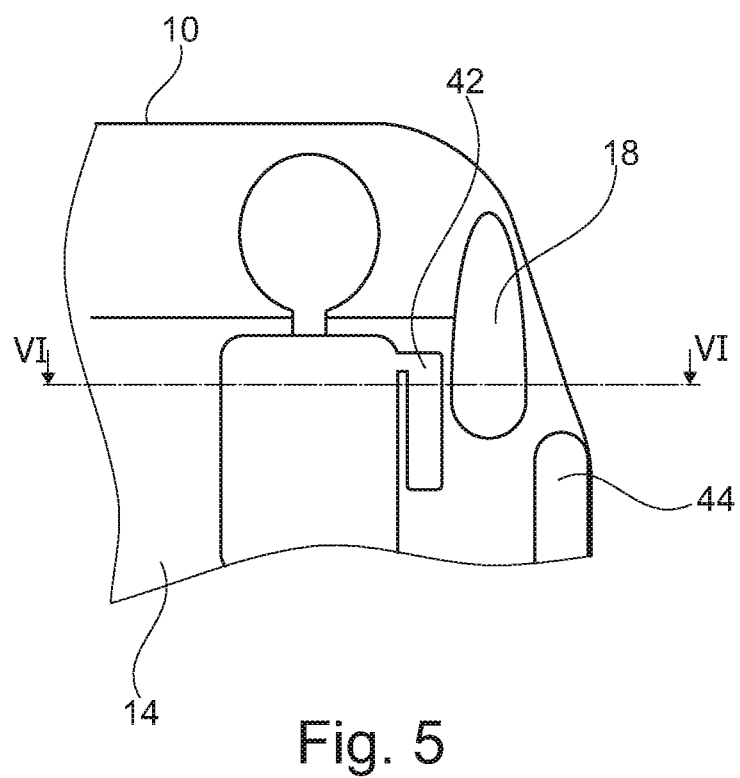
Figure 6:
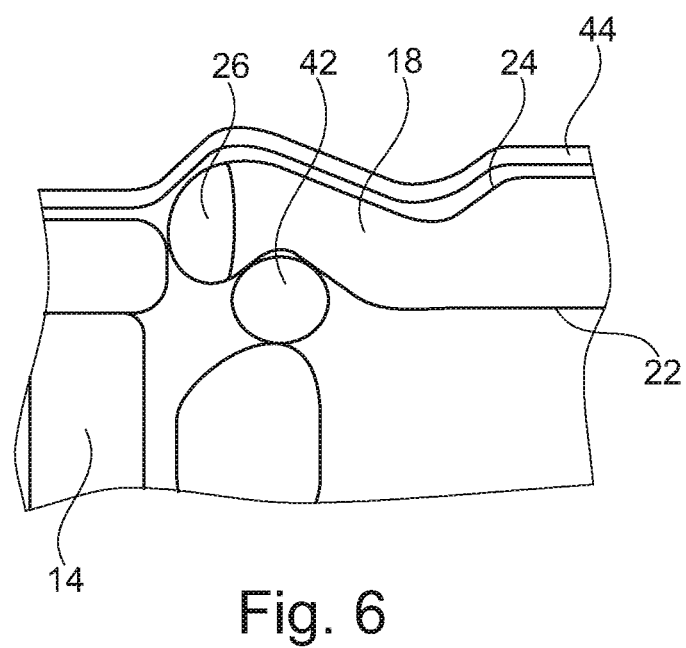

Further features and advantages of the invention will be resulting from the following description and from the attached drawings which are referred to, wherein:

FIG. 1 schematically shows a vehicle according to the invention comprising an airbag module according to the invention including an airbag according to the invention, FIG. 2 shows a perspective view of the airbag according to FIG. 1 in the inflated state, FIG. 3A shows a front panel of the airbag according to FIG. 2 in the unfastened spread state, FIG. 3B shows a rear panel of the airbag according to FIG. 2 in the unfastened spread state, FIG. 3C shows an additional panel of the airbag according to FIG. 2 in the unfastened spread state, FIG. 4 shows a schematic representation of the manufacture of the airbag according to FIG. 2, FIG. 5 shows a view of a vehicle occupant sitting on a back seat of the vehicle according to FIG. 1 with an inflated airbag, and FIG. 6 shows a sectional view along the line VI-VI of FIG. 5.

DESCRIPTION

In FIG. 1, an interior of a vehicle 10 is extremely schematically shown. The vehicle 10 is a passenger car or a truck, for example.

The vehicle 10 has two front seats 12, plural back seats 14 as well as an airbag module 16 as part of a vehicle occupant restraint system.

In FIG. 1, merely a front seat 12 and a back seat 14 as well as the airbag module 16 which is fastened to a roof pillar 17 of the vehicle 10 are shown. The airbag module 16 thus is a curtain airbag module, more exactly speaking a curtain-Thorax airbag (CTAB) module.

The airbag module 16 has an airbag 18 and an inflator 20 which is arranged for inflating the airbag 18 in the case of release. In the shown example configuration, the inflator 20 is disposed inside the airbag 18. However, it is also imaginable that the inflator is disposed outside the airbag 18 and may inflate the airbag 18 by means of an inflation mouth of the airbag 18.

In FIG. 2, the airbag 18 is separately shown in a perspective in the inflated state and the single parts of the airbag 18 are shown in the unfastened spread state in FIGS. 3a, 3b and, resp., 3c.

The airbag 18 has a front panel 22 (FIG. 3a), a rear panel 24 (FIG. 3b) as well as an additional panel 26 (FIG. 3c) which are interconnected and form the outer shell of the airbag 18.

The front panel 22, the rear panel 24 and the additional panel 26 are connected, for example, by a seam. The connection or, resp., the seam is shown in a dot and dash line in FIG. 2.

However, also other connecting options are imaginable, such as adhesive bonding or weaving.

The airbag 18 has a longitudinal direction L, a vertical direction H and a transverse direction Q which are in conformity with the longitudinal vehicle direction, the vertical vehicle direction and, resp., the transverse vehicle direction especially in the inflated state.

In the shown example configuration, the airbag 18, especially in the inflated state, is larger in the longitudinal direction L than in the vertical direction H. The expansion in the transverse direction Q is smaller than the expansion in the longitudinal direction L and is also smaller than the expansion in the vertical direction H.

The front panel 22 and the rear panel 24 delimit the airbag 18 in the transverse direction Q and are interconnected at their entire circumference.

As is clearly visible from FIGS. 3a and 3b, the front panel 22 and the rear panel 24 are identical so that also their circumferences have completely identical contours.

The front panel 22, the rear panel 24 and/or the additional panel 26 are e.g. single planar fabric layers having a circumference of a predetermined contour.

Each of the circumferences of the front panel 22 and the rear panel 24 has a first circumferential portion 28 and a second circumferential portion 30. The first circumferential portion 28 and the second circumferential portion 30 together make up for e.g. the entire circumference of the front panel 22 and, resp., of the rear panel 24.

Just as the contour of the circumferences, also the layers of the first circumferential portion 28 and of the second circumferential portion 30 may be identical at the front panel 22 and the rear panel 24.

In the shown example configuration, the second circumferential portion 30 is provided at a vertical-side end, i.e. at an end at which the circumference extends in the vertical direction H.

For example, the entire vertical-side end 32 is part of the second circumferential portion 30.

The additional panel 26 shown in FIG. 3c has a contour different from that of the front panel 22 and the rear panel 24.

In the shown example configuration, the additional panel 26 includes merely two edges, viz. a leading edge 34 and a trailing edge 36.

The leading edge 34 and the trailing edge 36 are largely opposed to each other and delimit the additional panel 26.

The leading edge 34 and the trailing edge 36 merge into each other at two points, especially at the two ends of the leading edge 34 and the trailing edge 36.

At said transitions, the leading edge 34 and the trailing edge 36 enclose an acute angle α.

The leading edge 34 and the trailing edge 36 correspond to the second circumferential portion 30 of the front panel 22 and, resp., of the rear panel 24 in terms of geometry and length, for example.

As is evident from FIG. 2, the front panel 22 is connected in its second circumferential portion 30 to the leading edge 34 of the additional panel and the rear panel 24 is connected in its second circumferential portion 30 to the trailing edge 36 of the additional panel 26.

Thus, in the second circumferential portion 30 of the front panel 22 and, resp., of the rear panel 24 the front panel 22 and the rear panel 24 are interconnected by means of the additional panel 26.

In the first circumferential portions 28 of the front panel 22 and the rear panel 24, the front panel 22 and the rear panel 24 are directly connected to each other.

In this way, the airbag 18 is significantly thicker in the area of the second circumferential portion, i.e. has a larger expansion in the transverse direction Q than in the area of the first circumferential portion 28 in which the front panel 22 and the rear panel 24 are directly fastened to each other.

The additional panel 26 itself extends substantially in the vertical direction H.

Said area of the airbag 18 having a larger thickness is provided in a shoulder area of the back seat 14 in the inflated state, with the additional panel 26 being directed toward the tail of the vehicle 10. The additional panel 26 thus is disposed at an end of the airbag 18 facing the tail of the vehicle 10.

The manufacture of the airbag 18 is partly illustrated in FIG. 4. To start with, a first panel 38, such as the front panel 22, as well as the additional panel 26 are provided.

The second circumferential portion 30 of the first panel 38 is connected, for example sewn, to the leading edge 34 and, resp., the trailing edge 36 of the additional panel 26. The intermediate product obtained in this way is shown at the top of FIG. 4.

As a matter of course, it is also imaginable that said intermediate product is formed in one piece, i.e. that the additional panel 26 is formed integrally with the front panel 22 and, resp., with the rear panel 24, for example as one single fabric layer. In order to indicate the possible one-piece design, in FIG. 4 the separating line between the first panel 38 and the additional panel 26 is shown by a broken line.

In the next step, a second panel 40 is provided which is the rear panel 24, for example.

The second panel 40 then is connected to the intermediate product from the first panel 38 and the additional panel 26. More exactly speaking, in the first circumferential portion 28 of the first and second panels 38, 40 the first panel 38 is directly connected, for example sewn, to the second panel 40, and the second circumferential portion 30 of the second panel 40 is connected, for example sewn, to the trailing edge 36 and, resp., to the leading edge 34 of the additional panel 26.

In this way, the airbag 18 shown in FIG. 2 is obtained.

In FIGS. 5 and 6, a cutout of the vehicle 10 is illustrated with the airbag module 16 being released, i.e. the airbag 18 being inflated.

FIG. 5 illustrates a view from the front of a vehicle occupant sitting on a back seat 14, and FIG. 6 illustrates a section along the line VI-VI of FIG. 5.

It is clearly evident that the airbag 18 has a large thickness in the shoulder area of the back seat 14 to stabilize the vehicle occupant without having a further downward expansion, however.

As is evident from FIG. 6, the increased thickness is facilitated by the additional panel 26 which is provided between the shoulder 42 of the vehicle occupant and the door lining 44.

In this way, an airbag 18 of increased thickness in the shoulder area can be provided without the airbag 18 having a particularly large volume or a large expansion in the vertical vehicle direction.

The invention claimed is:

1. An airbag for a vehicle occupant restraint system comprising a front panel (22), a rear panel (24) and an additional panel (26), wherein the front panel (22) and the rear panel (24) are interconnected at their circumference,
wherein, in a first circumferential portion (28) of the front panel (22) and in a first circumferential portion (28) of the rear panel (24), the front panel (22) and the rear panel (24) are directly connected to each other, and
wherein, in a second circumferential portion (30) of the front panel (22), the front panel (22) is connected to the additional panel (26) and, in a second circumferential portion (30) of the rear panel (24), the additional panel (26) is connected to the rear panel (24).

2. The airbag according to claim 1, wherein the airbag (18) has an outer shell which includes the front panel (22), the rear panel (24) and the additional panel (26).

3. The airbag according to claim 1 wherein the additional panel (26) includes a leading edge (34) and a trailing edge (36), the leading edge (34) being connected to the front panel (22) and the trailing edge (36) being connected to the rear panel (24).

4. The airbag according to claim 3, wherein leading edge (34) and the trailing edge (36) enclose an acute angle ($\alpha$) in the unfastened spread state of the additional panel (26).

5. The airbag according to claim 1, wherein the unfastened spread state, the circumference of the front panel (22) and the circumference of the rear panel (24) have a substantially identical contour.

6. The airbag according to claim 1, wherein the airbag has a longitudinal direction (L) and a vertical direction (H), the second circumferential portion (30) being provided at a vertical-side end of the airbag (18).

7. The airbag according to claim 6, wherein the airbag (18) is larger in the longitudinal direction (L) than in the vertical direction (H).

8. The airbag according to claim 1, wherein the additional panel (26) is formed integrally with the front panel (22) or the rear panel (24).

9. An airbag module for a vehicle occupant restraint system, comprising an inflator (20) and the airbag (18) according to claim 1.

10. A vehicle comprising at least one back seat (14) and the airbag (18) according to claim 1, wherein, in the inflated state, the additional panel (26) is disposed in the area of the back seat (14).

11. A method of manufacturing an airbag (18) according to claim 1, comprising the following steps of:
providing a first panel (38) for the airbag (18) and an additional panel (26) for the airbag (18),
connecting the additional panel (26) to the first panel (28) in a second circumferential portion (30) of the first panel (38),
providing a second panel (40) for the airbag (18),
connecting the second panel (40) directly to the first panel (38) in a first circumferential portion (28) of the first panel (38) and a first circumferential portion (28) of the second panel (40), and
connecting the second panel (40) to the additional panel (26) at a second circumferential portion (30) of the second panel (40).

12. The method according to claim 11, wherein the first panel (38) is a rear panel (24) of the airbag (18) and the second panel (40) is a front panel (22) of the airbag (18), or vice versa.

13. The airbag according to claim 1, wherein the airbag is a side airbag.

14. The airbag according to claim 4, wherein leading edge (34) and the trailing edge (36) enclose the acute angle ($\alpha$) at both ends of the leading edge (34) and of the trailing edge (36).

15. The airbag according to claim 1, wherein the unfastened spread state, the circumference of the front panel (22) and the circumference of the rear panel (24) have a completely identical contour.

16. The airbag according to claim 6, wherein the vertical-side end is completely provided in the second circumferential portion (30).

17. The vehicle of claim 10, wherein, in the inflated state, the additional panel (26) is disposed in a shoulder area of the back seat (14).

18. A vehicle comprising at least one back seat (14) and an airbag (18) according to claim 1, wherein, in the inflated state, the additional panel (26) is provided at an end of the airbag (18) facing the tail of a vehicle (10).

19. The method of claim 11, wherein the step of connecting comprises sewing the additional panel (26) to the first panel (28) in a second circumferential portion (30) of the first panel (38).

* * * * *